United States Patent [19]
Martin

[11] Patent Number: 5,401,167
[45] Date of Patent: Mar. 28, 1995

[54] GAS BURNER

[75] Inventor: Peter Martin, Loughborough, England

[73] Assignee: British Gas Plc, London, England

[21] Appl. No.: 151,356

[22] Filed: Nov. 12, 1993

[30] Foreign Application Priority Data

Nov. 19, 1992 [GB] United Kingdom ............ 9224309

[51] Int. Cl.⁶ ............................................ F27D 17/00
[52] U.S. Cl. ........................... 432/181; 239/132.3;
239/548; 431/174; 431/190
[58] Field of Search ............ 431/177, 174, 164, 160,
431/190; 432/180, 181, 182; 239/132.3, 553,
553.5, 548

[56] References Cited

U.S. PATENT DOCUMENTS

| 2,300,426 | 11/1942 | Longenecker . | |
|---|---|---|---|
| 3,338,570 | 8/1967 | Zimmer | 239/548 |
| 4,313,722 | 2/1982 | Yigdall | 432/180 |

FOREIGN PATENT DOCUMENTS

| 0496963 | 8/1992 | European Pat. Off. . |
| 2234817 | 1/1975 | France . |
| 552876 | 4/1943 | United Kingdom . |
| 814139 | 5/1959 | United Kingdom . |
| 1035536 | 7/1966 | United Kingdom . |
| 1266201 | 3/1972 | United Kingdom . |
| 1379469 | 1/1975 | United Kingdom . |

OTHER PUBLICATIONS

Glass Industry, vol. 73, No. 4, Mar. 10, 1992, G. C. Neff, Sr., et al., "Will a Natural Gas Cracker Technique Reduce NOx Emissions?", pp. 31-33.
Patent Abstracts of Japan, vol. 004, No. 136 (M-033), Sep. 24, 1980, JP-A-55 092 803, Jul. 14, 1980.

Primary Examiner—Carroll B. Dority
Attorney, Agent, or Firm—Oblon, Spivak, McClelland, Maier & Neustadt

[57] ABSTRACT

A gas burner particularly intended to produce diffusion flames of good emissivity and luminosity in an industrial furnace, for example a reverberation furnace such as may be used in glass making. The burner has a plate forming a burner nozzle having a central through first bore surrounded by a circular array of six smaller diameter second bores. One of the second bores is parallel with the axis of the central first bore. Whereas the other five second bores are each respectively disposed at an acute angle of substantially 22.5° to the axis of the central first bore. Fuel gas is supplied to the central first bore through a central tube and to the second bores through an annular passage between the central tube and a surrounding tube.

19 Claims, 1 Drawing Sheet

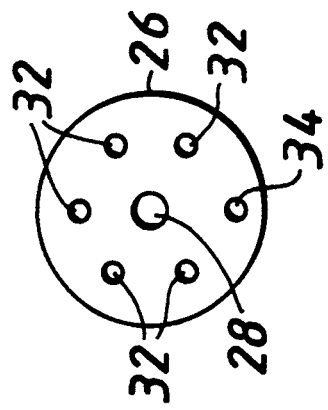
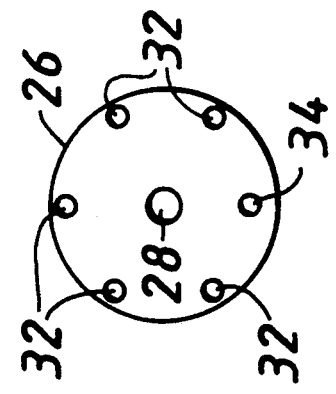
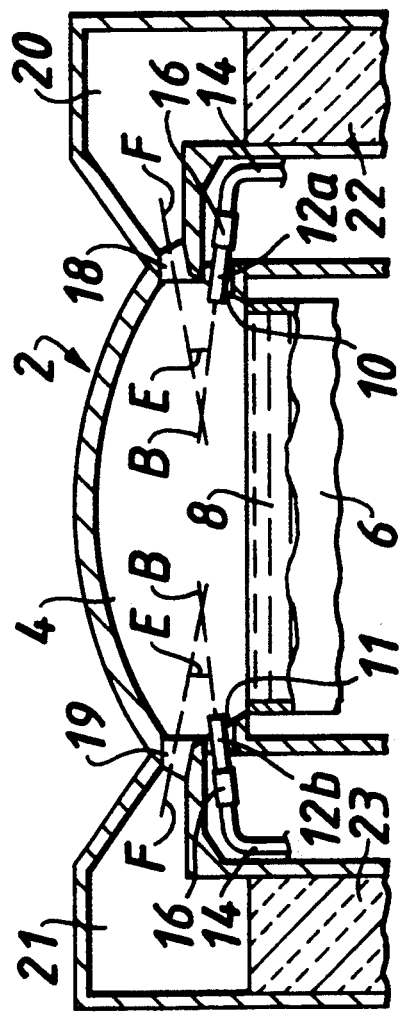
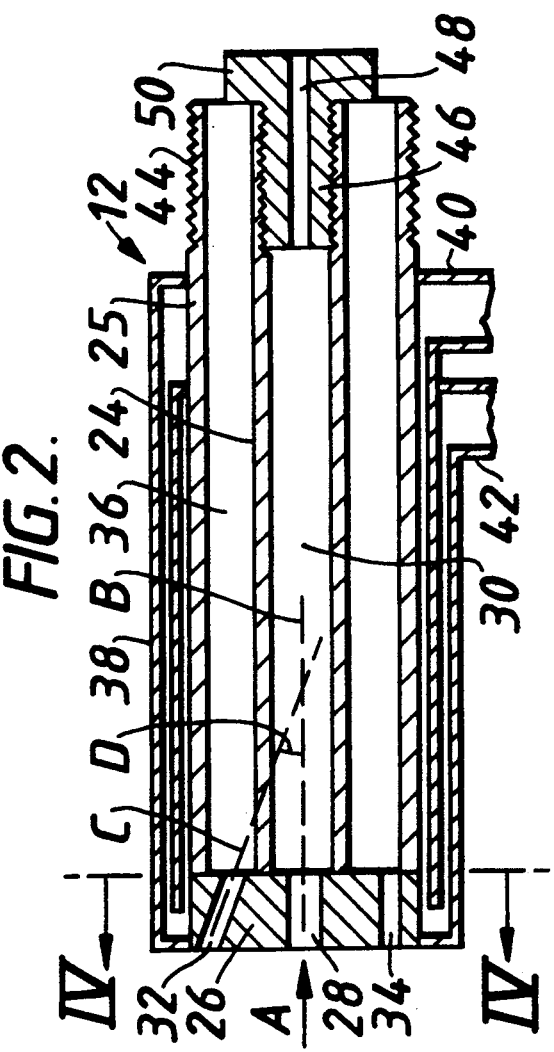

GAS BURNER

BACKGROUND OF THE INVENTION

This invention concerns a gas burner and also a reverberatory furnace provided with at least one gas burner.

Herein a reverberatory furnace means a furnace in which heating flames are directed into a combustion chamber above a tank containing a load to be melted or maintained molten and wherein hot products of combustion circulate above the tank and heat radiates down onto the surface of the tank load from said flames and from surfaces of the chamber.

High temperature, for example 1000° C. and above, melting of metals and non-metal materials can be achieved in a reverberatory furnace by the above surface firing of the process material or load with gas flames. Heat transfer to the process material or load occurs through convection from the hot combustion product flows and from radiant heat transfer either directly from the flame and/or from adjacent furnace surfaces. The thermal efficiency and rate of melting of the process normally depends on the flame radiant heating properties since this heat transfer mechanism is more effective than convection at higher process temperatures (i.e. greater than 1200° C.).

High process temperatures also require high flame temperatures and this is often achieved by using preheated combustion air or mixing the fuel gas with oxygen. Both techniques result in increased levels of combustion generated pollutants, in particular NOx. Increasing the radiant emissivity of gas flames would result in greater heat transfer to the process, lower flame temperatures, and hence lower NOx emission levels.

An object of the invention is to provide a gas burner intended to produce flames having greater flame luminosity and emissivity, a higher heat transfer rate and lower NOx emission levels than gas burners (not having the increased luminosity and emissivity) currently available for high temperature processes, for example processes performed at substantially 1000° C. or above.

SUMMARY OF THE INVENTION

According to the invention a gas burner comprises a nozzle formed with a plurality of first and second through apertures for the passage of fuel gas therethrough, there being a first aperture surrounded by a plurality of second apertures disposed in an array about the first aperture, means whereby fuel gas can be supplied to the nozzle to emerge from the first and second apertures, the cross-sectional area of the first aperture being greater than the cross-sectional area of any said second aperture, and at least one said second aperture facing along a direction which is at an acute angle to a direction along which the first aperture faces.

Preferably fuel gas, for example natural gas, is injected through the burner nozzle into a cold or preheated combustion air flow to produce diffusion flames. This may occur in a reverbatory furnace in which the resultant diffusion flame has a higher flame emissivity and luminosity than is currently possible with conventional gas burner designs used in such furnaces. The increased emissivity produces higher radiant heat flux to the tank load and adjacent surfaces of the combustion chamber and enhances the load melting capacity. Also the increased emissivity can result in a lower flame temperature being possible and thus less NOx production.

It is believed that the increased or higher flame emissivity is caused by the partial thermal cracking of the fuel gas flow. The thermal cracking is due to high heat transfer rates between the individual jets of gas emerging from the first and second apertures of the nozzle. It is thought that the jet of gas from the first aperture is pre-heated by flamelets from the surrounding second apertures to induce thermal cracking. Thermal cracking is the heat induced conversion of the fuel gas chemical species into free carbon and/or other hydrocarbons of higher carbon to hydrogen ratio than are otherwise contained in the fuel. The presence of these produces an increased flame emissivity and luminosity.

BRIEF DESCRIPTION OF THE DRAWINGS

The invention will now be further described, by way of example, with reference to the accompanying drawing in which:

FIG. 1 shows in cross-section a diagrammatic view of a reverberatory furnace provided with gas burners formed according to the invention;

FIG. 2 shows in cross-section an embodiment of a burner formed according to the invention, and used in the furnace in FIG. 1, the burner in FIG. 2 being shown with a cooling water jacket omitted from the burners in FIG. 1;

FIG. 3 is an end view in the direction of arrow A in FIG. 2 of the burner without the water jacket, and FIG. 4 is a cross-sectional view on line IV—IV in FIG. 2 with the water jacket omitted.

DETAILED DESCRIPTION OF THE PREFERRED EMBODIMENTS

FIG. 1 shows a reverberatory furnace 2 comprising a combustion chamber 4 over a tank 6 extending substantially for the length of chamber 4 and containing a load 8 to be melted or kept molten. A plurality of spaced openings 10 or 11 is provided in each opposite longitudinal wall of the combustion chamber along the length thereof (only one opening 10 or 11 being shown in each longitudinal wall). Each opening 10 or 11 contains one or more gas burners 12a or 12b each of which may protrude into the combustion chamber 4 and is supplied with fuel gas, for example natural gas, under pressure from a suitable supply including supply piping 14 coupled at 16 with the burner.

A plurality of spaced openings 18 or 19 is also provided in each opposite longitudinal wall of the combustion chamber along the length thereof (only one opening 18 or 19 being shown in each longitudinal wall). Each opening 18 on one side is associated with a respective burner opening 10 and is in communication with a passage arrangement 20 through which combustion air under pressure can be supplied to the combustion chamber 4 when the burners 12a are supplying fuel gas. Each opening 11 in the other side is associated with a respective burner opening 11 and is in communication with a passage arrangement 21 which acts as a flue through which combustion products can leave the chamber 4 when the burners 12a are supplying the fuel gas and the burners 12b are not because their fuel supply is turned off. On the other hand when the burners 12b are supplying fuel gas and the supply to the burners 12a is turned off combustion air is supplied under pressure to the chamber 4 through the openings 19 from the passage arrangement 21 whereas the openings 18 and passage arrangement 20 act as a flue. A control is provided to operate gas supply valve means, combustion air and flue valve means, and air blower mean to ensure that (i) when gas is supplied to the burner 12a the gas supply to the burner 12b is off and combustion air is supplied to the openings 18 from passage arrangement 20 whereas passage arrangement 21 is connected to a flue system; and (ii) when gas is supplied to the burners 12b the gas supply to the burners 12a is off and combustion air is supplied to the openings 19 from passage arrangement 21 whereas passage arrangement 20 is connected to the flue system. The control may operate to automatically switch the burners 12a or 12b on or off as it switches the passage arrangement 20 or 21 to air supply mode or to flueing mode in a timed cycle of operation, and/or according to temperature measurement.

Although the combustion air supplied may be cold, it is preferably pre-heated by including in each passage arrangement 20 or 21 a respective regenerator 22 or 23 comprising an air permeable arrangement of heat storage material which gives up to combustion air passing therethrough heat which the material absorbed from a previous flow of flue gases therethrough from the combustion chamber 4.

The reverberbatory furnace 2 may be used to perform heating processes requiring high temperatures, for example substantially 1000° C. and above. Such processes include metal melting and glass making, the load 8 in FIG. 1 indicating the molten metallic or non-metallic load. The furnace 2 in FIG. 1 is particularly suited to producing molten glass.

Each burner 12a or 12b from which heating flames issue over the surface of the load 8 is of substantially similar construction to the burner 12 in FIG. 2. Burner 12 comprises a central tube 24 of circular section concentrically surrounded by an outer tube 25 of circular section. Both tubes 24,25 are welded in a gas tight manner to a circular end plate or nozzle 26 having a central cylindrical through bore 28 opening into interior passage 30 of the tube 24. The bore 28 is surrounded by an array of cylindrical through bores 32 and 34 in the plate 26. At the exposed or outer face of the plate 26 (see FIG. 3), the openings into the bores 32,34 are substantially equally spaced circumferentially from one another and are substantially equally spaced from the central bore 28. The axis of the bore 28 coincides with axis B of the burner and the axis of the bore 34 is substantially parallel with the axis B. Each bore 32 has an axis C which is inclined at an acute angle D, for example substantially 22.5°, to the axis B. This means that when inner face of the plate 26 is considered as in FIG. 4 the opening into the bore 34 no longer lies on the same circle as the openings into the bores 32. All the bores 32,34 open into the annular passage 36 between the inner and outer tube 24,25. All the bores 32,34 have substantially the same diameter and each has a cross-sectional area less than that of the bore 26.

The burner 12 is made of heat withstanding material, for example a heat resistant metal and may be surrounded by a cooling water jacket 38 having an inlet 40 and an outlet 42.

A fuel gas supply pipe 14 (FIG. 1) can be attached to the burner 12 using a coupling 16 (FIG. 1) screwed to the outer tube 25 using screw thread 44 thereon. A desired relative distribution of gas flows between the nozzle aperture or bore 28 and the nozzle apertures or bores 32,34 can be achieved using a restriction formed by a plug 46 screw fitted into the tube 24 and having a central bore 48. The plug 46 has a head 50. The head 50 can be of a size which has little or no effect on the supply of fuel gas to the annular passage 36.

Considering the direction gas or flame flow from the burner, the direction of gas or flame flows from the apertures or bores 32 diverge from the direction of flow from the aperture or bore 28, whereas that from the bore 34 is substantially parallel to that from the bore 28. Thus when the burner is mounted in the furnace 2 as at 12a or 12b, the bore 34 is located nearer to the surface of the load 8 (in other words lowermost) than the bores 32. Preferably each burner is mounted so that the axis B of the burner and aperture 28 is at an acute angle E to the direction F of the flow of combustion air through the associated opening 18 or 19. Angle E is preferably in the range 5° to 50°. Angle E may be in a vertical plane but need not be so. The resultant diffusion flames from the burners may be at an angle to the surface of the load 8 or horizontal thereto. The burners may point transversely to the direction F of the combustion air flow, in which case the openings 10,11 may be in the walls of the openings 18,19.

It is believed that the burner 12 used in the furnace 2 gives an increased radiant emissivity and luminosity of natural gas flames resulting greater flame heat flux and heat transfer to the load 8.

As an example, the plate 26 may be substantially 13 mm thick and substantially 42 mm in diameter. The diameter of central aperture 28 may be substantially 5.0 mm and the diameter of each aperture 32,34 may be substantially 3.0 mm. The internal diameter of tube 25 may be substantially 34 mm and that of the tube 24 may be substantially 9 mm. The external diameter of the tube 24 may be substantially 14 mm. The length of each tube 24, 25 may be substantially 89 mm. The diameter of plug bore 48 may be substantially 3.0 mm. The length of the plug bore 48 may be substantially 34 mm and the length of the male threaded part of the plug 46 may be substantially 25 mm.

I claim:

1. A gas burner comprising a nozzle formed with a plurality of first and second through apertures for the passage of fuel gas therethrough, there being a first aperture surrounded by a plurality of second apertures disposed in an array about the first aperture, the cross-sectional area of the first aperture being greater than the cross-sectional area of any said second aperture, at least one said second aperture facing along a direction which is at an acute angle to a direction along which said first aperture faces, first and second tube means being arranged for supplying fuel gas respectively to said first aperture and said second apertures for said gas to emerge from said first and second apertures, said first aperture opening into the first tube means and said second apertures opening into said second tube means, and the first tube means being provided with gas flow restriction means.

2. A burner as claimed in claim 1, wherein the restriction means is a screw-in plug having a bore therethrough.

3. A burner as claimed in claim 1, wherein the first tube means is a first tube and the second tube means is a second tube surrounding the first tube.

4. A gas burner as claimed in claim 1, wherein the said second aperture faces along a direction which, along a general direction of gas issuing from the nozzle, diverges from the direction along which said first aperture faces.

5. A gas burner as claimed in claim 1, wherein a plurality of said second apertures each face along a respective direction which is at a respective acute angle to the direction along which the first aperture faces.

6. A burner as claimed in claim 1, wherein said acute angle is substantially 22.5°.

7. A burner as claimed in claim 1, wherein a said second aperture faces along a direction substantially parallel to that in which said first aperture faces.

8. A burner as claimed in claim 1, wherein the first aperture is a bore having a substantially circular cross-section.

9. A burner as claimed in claim 1, wherein at least one said second aperture is a bore having a substantially circular cross-section.

10. A burner as claimed in claim 1, wherein on a side of the burner from which fuel gas is to issue from the apertures, a plurality of said second apertures are disposed in a circular array substantially centered on the axis of the first aperture.

11. A furnace having at least one gas burner comprising a nozzle formed with a plurality of first and second through apertures for the passage of fuel gas therethrough, there being a first aperture surrounded by a plurality of second apertures disposed in an array about the first aperture, the cross-sectional area of the first aperture being greater than the cross-sectional area of any said second aperture, at least one said second aperture facing along a direction which is at an acute angle to a direction along which said first aperture faces, first and second tube means being arranged for supplying fuel gas respectively to said first aperture and said second apertures for said gas to emerge from said first and second apertures, said first aperture opening into the first tube means and said second apertures opening into said second tube means, and the first tube means being provided with gas flow restriction means.

12. A furnace as claimed in claim 12, arranged for combustion air to issue into a combustion chamber, and the flow of said issuing air being arranged to be adjacent to said burner.

13. A furnace as claimed in claim 12, wherein the first aperture of said burner faces along a direction at an acute angle to the direction of flow of said issuing combustion air.

14. A furnace as claimed in claim 13, in which said acute angle is between 5° and 50°.

15. A furnace as claimed in claim 11, wherein said at least one second aperture includes a lowermost second aperture facing along a direction substantially parallel with the direction in which the first aperture faces.

16. A furnace as claimed in claim 11, wherein a first plurality of said burners is disposed at one side of said furnace and a second plurality of said burners is disposed at an opposite side of said furnace, and first and second passage means are disposed respectively at said opposite sides each for alternately supplying combustion air and to act as a flue.

17. A furnace as claimed in claim 16, wherein said first and second passage means is each provided with heat regenerator means.

18. A furnace as claimed in claim 11, wherein said furnace is a reverberatory furnace.

19. A gas burner as claimed in claim 1, further comprising means supplying fuel gas to the first and second tube means for said gas to emerge from the first and second apertures, and wherein flames due to burning fuel gas from said second apertures heat fuel gas issuing from the first aperture for burning and thermally cracking said issuing gas.

* * * * *